(12) United States Patent
Esaka et al.

(10) Patent No.: US 11,139,667 B2
(45) Date of Patent: Oct. 5, 2021

(54) ELECTRIC POWER DEMAND/SUPPLY MANAGEMENT DEVICE

(71) Applicant: HONDA MOTOR CO., LTD., Tokyo (JP)

(72) Inventors: Shigeaki Esaka, Tokyo (JP); Toshiaki Hirota, Tokyo (JP); Keiichi Iguchi, Tokyo (JP); Shuji Nakayama, Tokyo (JP); Makoto Takano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 200 days.

(21) Appl. No.: 16/523,155

(22) Filed: Jul. 26, 2019

(65) Prior Publication Data

US 2020/0091752 A1     Mar. 19, 2020

(30) Foreign Application Priority Data

Sep. 13, 2018   (JP) .............................. JP2018-171175

(51) Int. Cl.
| | |
|---|---|
| *H02J 7/00* | (2006.01) |
| *G06Q 10/06* | (2012.01) |
| *B60L 53/62* | (2019.01) |
| *B60L 58/12* | (2019.01) |
| *G06Q 50/06* | (2012.01) |

(52) U.S. Cl.
CPC ............ *H02J 7/0068* (2013.01); *B60L 53/62* (2019.02); *B60L 58/12* (2019.02); *G06Q 10/06315* (2013.01); *G06Q 50/06* (2013.01); *B60Y 2200/91* (2013.01)

(58) Field of Classification Search
CPC .. H02J 7/0068; H02J 3/32; H02J 3/322; H02J 2310/48; H02J 7/0048; H02J 3/00; G06Q 10/06315; G06Q 50/06; B60L 53/62; B60L 58/12; B60L 55/00; B60L 53/67; B60L 53/68; B60Y 2200/91; Y02E 60/00; Y04S 10/126; Y02T 90/12; Y02T 10/7072; Y02T 10/70; Y02T 90/16
See application file for complete search history.

(56) References Cited

U.S. PATENT DOCUMENTS

| | | | | |
|---|---|---|---|---|
| 9,153,966 | B2 * | 10/2015 | Ishida | .................. G07F 15/008 |
| 9,859,735 | B2 * | 1/2018 | Sakuma | .................... H02J 3/32 |
| 9,881,270 | B2 * | 1/2018 | Hashimoto | ............ G06Q 50/06 |
| 10,661,678 | B2 * | 5/2020 | Vidhi | .................. G06Q 20/145 |
| 2009/0313104 | A1 * | 12/2009 | Hafner | ................. B60L 3/0046 |
| | | | | 705/14.25 |

(Continued)

FOREIGN PATENT DOCUMENTS

JP       2015-032286      2/2015

*Primary Examiner* — Nha T Nguyen
(74) *Attorney, Agent, or Firm* — Rankin, Hill & Clark LLP

(57) ABSTRACT

An electric power demand/supply management device includes: a state information acquisition unit that obtains state information indicating the current state of a battery which is mounted on, for example, a vehicle; a performance calculation unit that calculates a performance index indicating the consumption degree of the battery from the state information; and an incentive imparting unit that imparts an incentive according to a value of the performance index to a provider who provides the battery as electric power demand/supply adjustment means of an electric power transmission/distribution system.

5 Claims, 6 Drawing Sheets

(56) References Cited

U.S. PATENT DOCUMENTS

| | | | | |
|---|---|---|---|---|
| 2012/0249068 A1* | 10/2012 | Ishida | ............... | G07F 15/005 |
| | | | | 320/109 |
| 2013/0082640 A1* | 4/2013 | Nishibayashi | .......... | B60L 53/63 |
| | | | | 320/106 |
| 2013/0110606 A1* | 5/2013 | Seyhan | ............... | G06Q 30/02 |
| | | | | 705/14.25 |
| 2013/0346308 A1* | 12/2013 | Naito | ............... | G07F 15/005 |
| | | | | 705/41 |
| 2014/0042978 A1* | 2/2014 | Nishibayashi | .......... | H02J 7/007 |
| | | | | 320/134 |
| 2014/0084686 A1* | 3/2014 | Nishibayashi | .......... | H02J 3/322 |
| | | | | 307/26 |
| 2014/0117933 A1* | 5/2014 | Nyu | ............... | B60L 53/66 |
| | | | | 320/109 |
| 2021/0053458 A1* | 2/2021 | Fujiwara | ............... | H02J 3/38 |

* cited by examiner

FIG.4

| PROVIDER ID | PERSONAL INFORMATION | PROVIDER TERMINAL INFORMATION | CUSTOMER NUMBER | VEHICLE IDENTIFICATION NUMBER | VEHICLE COMMUNICATION INFORMATION | DEVICE ID | SET INCENTIVE | REFUSAL OF NEXT PARTICIPATION | POSSESSED INCENTIVE |
|---|---|---|---|---|---|---|---|---|---|
| Pt-1 | Add_1 | Pterm_1 | Cst_1 | Cid_1 | Cterm_1 | Aprt_1 | 1000 | OK | 30000 |
| Pt-2 | Add_2 | Pterm_2 | Cst_2 | Cid_2 | Cterm_2 | Aprt_2 | 1500 | OK | 15000 |
| Pt-3 | Add_3 | Pterm_3 | Cst_3 | Cid_3 | Cterm_3 | Aprt_3 | 800 | NG | 20000 |
| ⋮ | ⋮ | ⋮ | ⋮ | ⋮ | ⋮ | ⋮ | ⋮ | ⋮ | ⋮ |

FIG.5

| PROVIDER ID | INITIAL PERFORMANCE INFORMATION | | STATE INFORMATION | | | | | | | | PERFORMANCE INDEX | |
|---|---|---|---|---|---|---|---|---|---|---|---|---|
| | INITIAL CAPACITY | INITIAL Z | DATA AT CHARGING TIME | | | CHARGING CAPACITY | DATA AT DISCHARGING TIME | | | TEMPERATURE HISTORY | DETERIORATION DEGREE (CAPACITY RETENTION RATE) | LIFETIME |
| | | | VOLTAGE | CURRENT | OUTPUT Z | | VOLTAGE | CURRENT | OUTPUT Z | | | |
| Pt-1 | Qi_1 | Zi_1 | Vc_1(t) | Ic_1(t) | Zc_1(t) | Qc_1 | Vd_1(t) | Id_1(t) | Zd_1(t) | Th_1(t) | Rq_1 | T_1 |
| Pt-2 | Qi_2 | Zi_2 | Vc_2(t) | Ic_2(t) | Zc_2(t) | Qc_2 | Vd_2(t) | Id_2(t) | Zd_2(t) | Th_2(t) | Rq_2 | T_2 |
| Pt-3 | Qi_3 | Zi_3 | Vc_3(t) | Ic_3(t) | Zc_3(t) | Qc_3 | Vd_3(t) | Id_3(t) | Zd_3(t) | Th_3(t) | Rq_3 | T_3 |
| ... | ... | ... | ... | ... | ... | ... | ... | ... | ... | ... | ... | ... |

ELECTRIC POWER DEMAND/SUPPLY MANAGEMENT DEVICE

INCORPORATION BY REFERENCE

The present application claims priority under 35 U.S.C. § 119 to Japanese Patent Application No. 2018-171175 filed on Sep. 13, 2018. The content of the application is incorporated herein by reference in its entirety.

BACKGROUND OF THE INVENTION

Field of the Invention

The present invention relates to an electric power demand/supply management device that manages electric power demand/supply adjustment in an electric power transmission/distribution system.

Description of the Related Art

It is known that when an imbalance in electric power demand/supply such as a surplus of electric power or a shortage of electric power occurs in an electric power transmission/distribution system managed by an electric power company, etc., adjustment of a balance in electric power demand/supply (electric power demand/supply adjustment) is performed by connecting a battery mounted on an electric vehicle, etc. to the electric power transmission/distribution system.

For example, Japanese Patent Laid-Open No. 2015-032286 discloses an electric power management system that presents to users a condition for encouraging to perform charge/discharge of a battery provided in a vehicle, etc. in an area where a surplus of electric power or a shortage of electric power has occurred and imparts an incentive to users who have performed the charge/discharge according to the condition.

On the other hand, from the viewpoint of users asked to participate in electric power demand/supply adjustment, they are worried about the deterioration degree and/or remaining lifetime of a battery mounted on a vehicle, which depend on the operating state, etc. of the vehicle, and they are also worried that participation in the electric power demand/supply adjustment by connecting the battery to a power transmission/distribution system may cause a change in the performance and consumption degree of the battery. Therefore, they tend to hesitate to participate in the electric power demand/supply adjustment.

SUMMARY OF THE INVENTION

The present invention has been made in view of the background described above, and it is an object of the present invention to provide an electric power demand/supply management device that can encourage battery users to participate in electric power demand/supply adjustment in an electric power transmission/distribution system.

An aspect of the present invention is an electric power demand/supply management device that includes: a state information acquisition unit that obtains state information indicating the current state of a battery; a performance calculation unit that calculates a performance index indicating a consumption degree of the battery from the state information; and an incentive imparting unit that imparts an incentive according to a value of the performance index to a provider who provides the battery as electric power demand/supply adjustment means of an electric power transmission/distribution system.

According to another aspect of the present invention, the performance index represents the deterioration degree or lifetime of the battery.

According to another aspect of the present invention, the incentive imparting unit sets an incentive imparted to the provider to be greater as the consumption degree indicated by the performance index is larger.

According to another aspect of the present invention, the incentive imparting unit presents (or proposes) a size (or amount) of the incentive to the provider before the battery actually participates in the electric power demand/supply adjustment; and imparts the presented size of the incentive to the provider after the battery actually participates in the electric power demand/supply adjustment.

According to another aspect of the present invention, an operation of the battery as the electric power demand/supply adjustment means is a charge operation from the electric power transmission/distribution system to the battery or a discharge operation from the battery to the electric power transmission/distribution system. The incentive imparting unit sets, according to an occurrence frequency of a surplus of electric power or a shortage of electric power in the electric power transmission/distribution system, an incentive for the provider to be different in size (or amount) between a case where the operation of the battery in participating in the electric power demand/supply adjustment is the charging operation and a case where the operation is the discharging operation.

According to another aspect of the present invention, the battery is a battery mounted on a vehicle as a power source.

Advantageous Effect of Invention

According to the present invention, effective encouragement can be made for battery users to participate in the electric power demand/supply adjustment in the electric power transmission/distribution system.

BRIEF DESCRIPTION OF THE DRAWINGS

FIG. 4 shows one example of a provider management DB that is held by a storage device of the electric power demand/supply management device shown in FIG. 2;

FIG. 5 shows one example of a battery management DB that is held by the storage device of the electric power demand/supply management device shown in FIG. 2.

DETAILED DESCRIPTION OF THE PREFERRED EMBODIMENTS

Hereafter, the embodiments of the present invention will be described with reference to drawings.

1. Electric Power Management Device and Its Application Example

Figure 1:
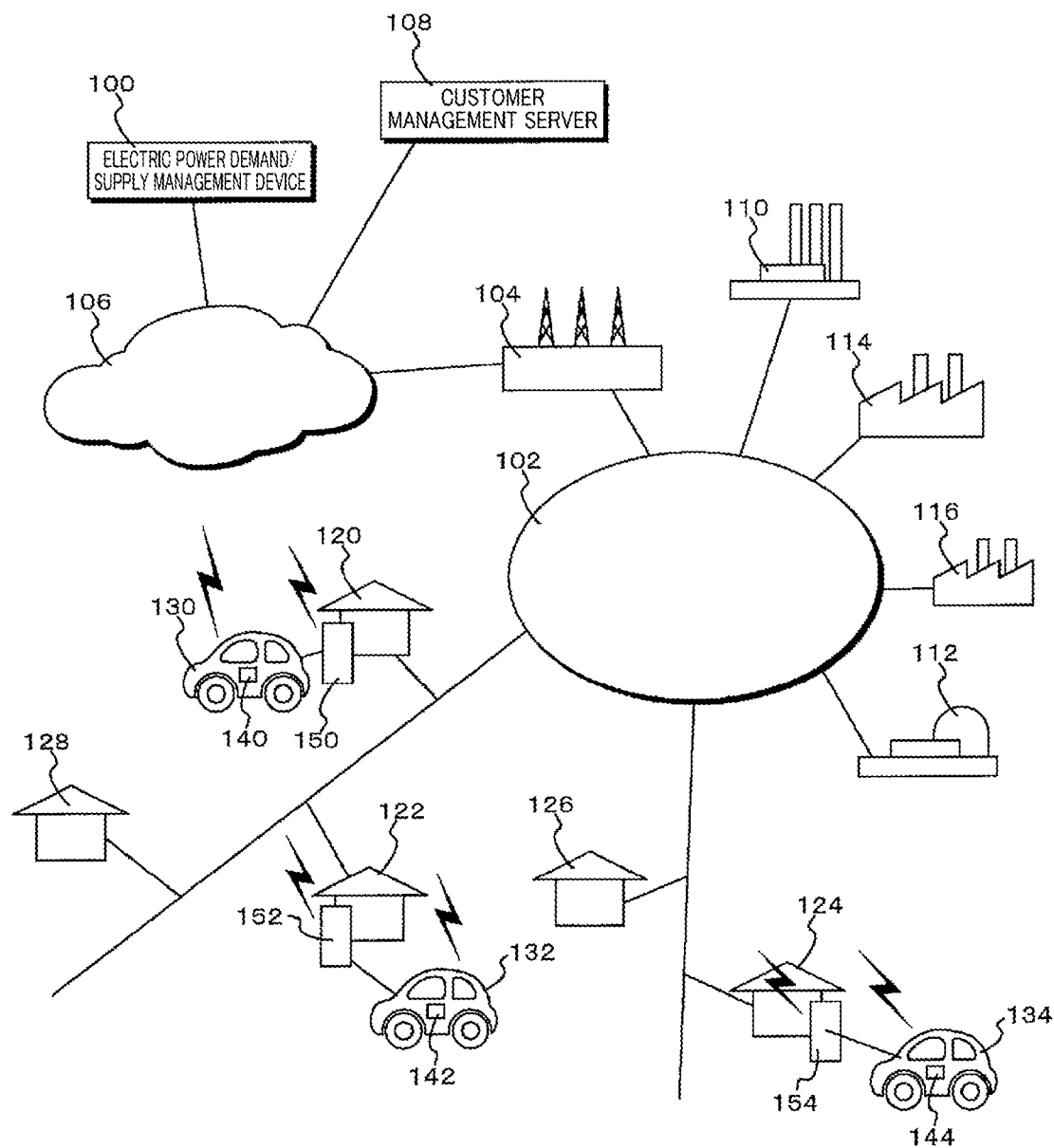
FIG. 1 shows one example of cases where an electric power demand/supply management device according to one embodiment of the present invention is used.

FIG. 1 shows an example in which the electric power demand/supply management device according to one embodiment of the present invention is applied. An electric power demand/supply management device 100 encourages participation of batteries 140, 142, and 144 in electric power demand/supply adjustment in an electric power transmission/distribution system 102 so as to keep the electric power demand/supply balance stable in the electric power transmission/distribution system 102; and also controls the charge/discharge operation of the batteries 140, etc. (i.e., the batteries 140, 142, 144).

The electric power transmission/distribution system 102 receives supply of electric power from power plants 110 and 112 and transmits the electric power to factories 114 and 116 and houses 120, 122, 124, 126, and 128. The batteries 40, etc. are mounted on vehicles 130, etc. (i.e., the vehicles 130, 132, 134) as a power source. In this embodiment, for example, the batteries 140, 142, and 144 mounted on the vehicles 130, 132, and 134, which are electric vehicles, are connected to the electric power transmission/distribution system 102 via charge/discharge control devices 150, 152, and 154 provided in the houses 120, 122, and 124.

Hereby, the electric power transmission/distribution system 102 achieves the stabilization of an electric power demand/supply balance by receiving support of charge or discharge by the batteries 140, etc. when a surplus of electric power or a shortage of electric power occurs due to an imbalance of electric power demand/supply. That is, the batteries 140, etc. are used as electric power demand/supply adjustment means in the electric power transmission/distribution system 102 and contribute to improvement in an electric power demand/supply balance in the electric power transmission/distribution system 102. Here, the vehicles 130, etc. correspond to conveyances and the batteries 140, etc. correspond to batteries mounted on the conveyances as a power source. It is noted that the number of the batteries 140, etc. that are participation objects for the electric power demand/supply adjustment are not limited to three shown in FIG. 1 and it can be any number greater than this.

The electric power transmission/distribution operation of the electric power transmission/distribution system 102 is managed by an electric power transmission/distribution command center 104. The electric power demand/supply management device 100 is communicably connected to the electric power transmission/distribution command center 104 via a network 106. In addition, the electric power demand/supply management device 100 is communicably connected to a customer management server 108 of an electric power company owning the electric power transmission/distribution system 102 via a network 106. Further, the electric power demand/supply management device 100 is communicably connected to the vehicles 130, 132, and 134, and the charge/discharge control devices 150, 152, and 154 via the network 106. Here, the network 106 can be an internet that is connected through a public line by wired communication and/or wireless communication.

The electric power demand/supply management device 100 records and registers, in a provider management DB 250 (described later) of a storage device 202, providers who provide the batteries 140, 142, and 144, which are provided in the vehicles 130, 132, and 134, respectively, as the electric power demand/supply adjustment means. In addition, the electric power demand/supply management device 100 obtains information on an electric power demand/supply balance from the electric power transmission/distribution command center 104, and detects the occurrence of a surplus of electric power or a shortage of electric power. Further, the electric power demand/supply management device 100 controls, when a surplus of electric power occurs, the charge/discharge control devices 150, etc. (i.e., the device 150, 152, 154) to which the batteries 140, etc. of the vehicles 130, etc. of the above registered providers are connected, and operates the batteries 140, etc. in a charge mode. On the other hand, when a shortage of electric power occurs, the electric power demand/supply management device 100 controls the charge/discharge control devices 150, etc. to which the batteries 140, etc. of the vehicles 130, etc. of the registered providers are connected, and operates the batteries 140, etc. in a discharge mode. Thus, the electric power demand/supply management device 100 uses the batteries 140, etc. as the electric power demand/supply adjustment means, thereby improving an imbalance in electric power demand/supply in the electric power transmission/distribution system 102.

Especially, the electric power demand/supply management device 100 of the embodiment obtains, from the vehicles 130, etc., state information indicating the current state of each of the batteries 140, etc. which are mounted on the vehicles 130, etc. and calculates a performance index indicating the consumption degree of each of the batteries 140, etc. Then, the electric power demand/supply management device 100 imparts an incentive according to a value of the calculated performance index, to the providers who provide the batteries 140, etc. as the electric power demand/supply adjustment means of the electric power transmission/distribution system 102.

Thus, the electric power demand/supply management device 100 imparts an incentive according to the consumption degree of the batteries 140, etc. to the providers of the batteries 140, etc., and therefore, can encourage even users of vehicles 130, etc., who hesitate to provide the batteries 140, etc. which have been consumed to some degree, to provide the batteries 140, etc.

Here, the above incentive is, in this embodiment, so-called "points" that can be used for, for example, a discount on an electric power charge. However, the incentive is not limited to this; and it can be a freely selected one that can be beneficial to a provider and that can be imparted with the size of the benefit adjusted. For example, the incentive can be "points" that can be exchanged with giveaways, money, or monetary valuable items; or can be virtual money, or the like.

2. Configuration of Electric Power Demand/Supply Management Device 100

Figure 2:
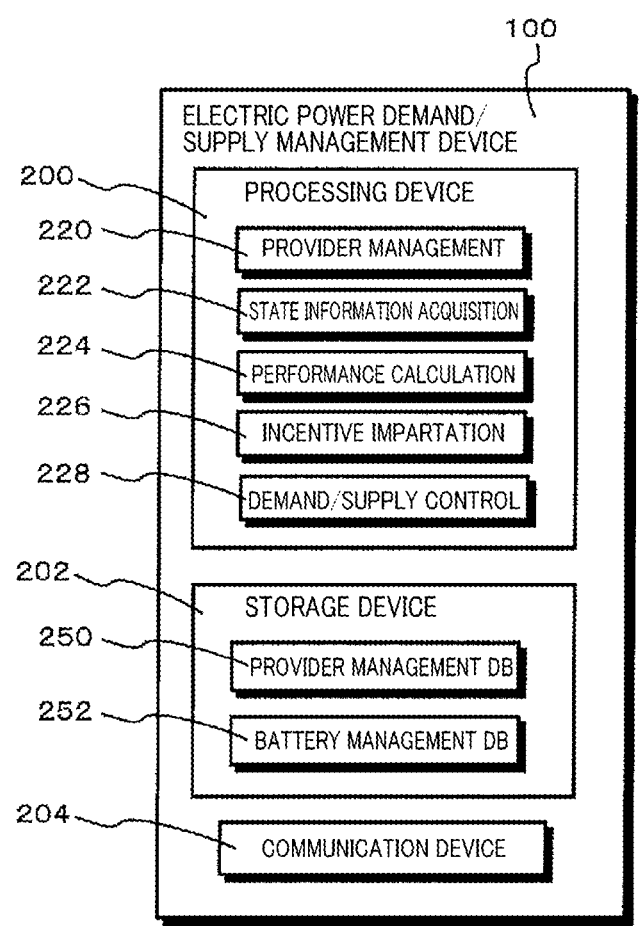
FIG. 2 shows the configuration of the electric power demand/supply management device according to one embodiment of the present invention.

FIG. 2 shows the configuration of the electric power demand/supply management device 100. The electric power demand/supply management device 100 includes a processing device 200, a storage device 202, and a communication device 204. The communication device 204 is a transceiver that performs wired communication or wireless communication for connecting the processing device 200 to the network 106. The storage device 202, which is constituted of, for example, a hard disk device, stores a provider management database (provider management DB) 250 and a battery management database (battery management DB) 252.

The processing device 200 is, for example, a computer provided with a processor such as a CPU (Central Processing Unit). The processing device 200 may be configured to include a ROM (Read Only Memory) in which programs have been written and a RAM (Random Access Memory) for temporarily storing data. In addition, the processing device 200 includes, as function elements or function units, a provider management unit 220, a state information acquisition unit 222, a performance calculation unit 224, an incentive imparting unit 226, and a demand/supply control unit 228.

These function elements included in the processing device 200 are implemented by, for example, executing a program by the processing device 200 that is a computer. It is noted that the above computer program can be stored in any computer-readable storage medium. Alternatively, all or part of the above function elements included in the processing device 200 can be each configured by hardware including one or more electronic circuit components.

The provider management unit 220 receives offers of participating in electric power demand/supply adjustment from users of the vehicles 130, etc.; and registers the users as providers of the batteries 140, etc. as electric power demand/supply adjustment means. Specifically, the provider management unit 220 receives participation applications from users who desire to participate in the electric power demand/supply adjustment. The users can, for example, by a mobile device, etc., access a website provided by the electric power demand/supply management device 100 and can transmit the participation application. A participation application includes: the name of a user; personal information such as address; provider terminal information including the communication address of the mobile device of the user; the customer number of the user in an electric power company; vehicle identification number such as a vehicle body number for identifying a vehicle to be provided; vehicle communication information including the address of an on-vehicle communication apparatus for communicating with the vehicle.

The provider management unit 220 creates provider information on the basis of the received participation application and stores the created provider information in the provider management DB 250 so as to register the user as a provider. Specifically, the provider management unit 220 generates a provider ID for identifying a user who has transmitted a participation application and also determines a facility ID for identifying a charge/discharge control device 150 or the like which is installed in a house 120 or the like of the user in the participation. In addition, the provider management unit 220 saves, in the provider management DB 250 stored by the storage device 202, provider information in which the personal information, provider terminal information, customer number, vehicle identification number, and vehicle communication information, which are included in the above application for participation, the above provider ID, and a device ID are associated with one another.

FIG. 4 shows one example of the provider management DB 250. In the illustrated example, the provider management DB 250 is configured in a tabular format; and on the second to fourth rows in the illustrated table, for example, provider information of providers who respectively provide vehicles 130, 132, and 134 as the electric power demand/supply adjustment means are shown. The provider information includes, in order from the leftmost column in the figure: an ID of a provider; the personal information, provider terminal information, and customer number of the provider; the vehicle identification number and vehicle communication information of a vehicle 130 or the like of the provider; a device ID of a charge/discharge control device 150 or the like; a set incentive; information on refusal of the next participation; and a possessed incentive. Here, the "Personal information" column that is the second column from the left in the figure, for example, shows a head address of a storage region in the storage device 202 in which the personal information of the provider is stored.

The set incentive and possessed incentive are managed by the incentive imparting unit 226 described later. In the "Set incentive" column, the amount of incentive to be imparted per participation in the electric power demand/supply adjustment, that is, the number of points, which is set for the provider by the incentive imparting unit 226, is saved.

In the "Refusal of next participation" column, the result of a prior determination by the provider about whether or not to participate, at the next occurrence of electric power demand/supply adjustment, in the electric power demand/supply adjustment is saved. The provider management unit 220 can receive the result of the prior determination from the mobile device of the provider and save it in the "Refusal of next participation" column. In addition, the "Possessed incentive" column shows the total amount of incentive that the user currently has, that is, the number of possessed points.

With reference to FIG. 2, the state information acquisition unit 222 obtains, from the vehicles 130, etc., state information showing the current states of the respective batteries 140, etc. which are mounted on the vehicles 130, etc. as a power source. Specifically, the state information acquisition unit 222 obtains, at a predetermined timing, the state information from the vehicles 130, etc. of the providers by using the respective vehicle communication information of registered providers with reference to the provider management DB 250. Then, the state information acquisition unit 222 associates the obtained state information and the provider ID of a corresponding provider with each other and saves them in a battery management DB 252 as one record. Here, the above predetermined timing can be preliminarily determined to be, for example, the first of every month.

The performance calculation unit 224 calculates a performance index indicating the consumption degree of a corresponding battery from the state information saved in the battery management DB 252; and saves it by addition to the record including a corresponding provider ID which is stored in the battery management DB 252. In this embodiment, the performance index is an index relating to the deterioration degree or lifetime of each of the batteries 140, etc.

More specifically, the index relating to the deterioration degree is the capacity retention rate of a corresponding battery 140 or the like and is defined, for example, by the ratio of the current charge capacity to the charge capacity in an initial state immediately after the manufacture of the battery. Alternatively, as an index relating to the deterioration degree, for example, a resistance increase rate may be used which is defined by the ratio of the current output impedance DC resistance component to the output impedance DC resistance component immediately after the manufacture of the respective battery 140 or the like.

In addition, the index relating to the lifetime can be an expected time that may be taken before the capacity retention rate becomes lower than a predetermined value or an expected time that is taken before the resistance increase rate becomes higher than a predetermined value, with reference to the current time. Here, the initial capacity and initial output impedance at the manufacture of each of the batteries 140, etc., which are required for calculating the deterioration degree and/or lifetime may, for example, be obtained in advance by the electric power demand/supply management device 100 from the server of a manufacturer of the vehicle 130 or the like under the approval of the provider and can be saved in the battery management DB 252 as a part of the state information. The performance calculation unit 224 calculates the above lifetime from the state information, for example, according to a predetermined deterioration model.

FIG. 5 shows one example of the battery management DB 252. In the illustrated example, the battery management DB 252 is configured in tabular form and battery information of each battery is shown in the fourth and subsequent rows. The battery information includes, in order from the leftmost column in the figure: a provider ID; initial performance information; state information collected by the state information acquisition unit 222; and a performance index calculated by the performance calculation unit 224.

The initial performance information includes: an initial capacity that is a charge capacity at the manufacture of the battery 140 or the like; and an initial impedance (abbreviated as "initial Z" in FIG. 5). In addition, the state information includes data at the time of charge, a charge capacity, data at the time of discharge, and a temperature history. The data at the time of charge includes, for example, a voltage, current, and output impedance which are measured at a predetermined time interval in the latest charge. The data at the time of discharge includes a voltage, current, and output impedance which are measured at a predetermined time interval within the latest predetermined time range. The charge capacity indicates the power storage amount of the battery 140 or the like at the latest full charge time, and the temperature history indicates a temperature measured at a predetermined time interval within the latest period of a predetermined length. It is note that a symbol with (t) in FIG. 4, such as $Vc\_1(t)$, means a set of measurement values that are obtained by calculation at the predetermined time interval.

In addition, in FIG. 5, the performance index includes the capacity retention rate, which is a deterioration degree, and lifetime. However, the battery management DB 252 shown in FIG. 5 is one example and is a non-limiting example. For example, the performance index can be indicated by either the deterioration degree or lifetime. In addition, initial performance information and/or state information can be one that does not include part of the items shown in FIG. 5 and can be one to which data being not illustrated is added.

With reference to FIG. 2, the incentive imparting unit 226 imparts, to providers who provide the respective batteries 140, etc. mounted on the respective vehicles 130, etc. as the electric power demand/supply adjustment means of the electric power transmission/distribution system 102, an incentive according to a value of the performance index which is calculated for the corresponding batteries 140, etc. For example, the incentive imparting unit 226 sets an incentive, which is imparted per participation in electric power demand/supply adjustment, to be higher, that is, sets more points as the consumption degree of the corresponding battery 140 or the like, which is obtained from the above performance index, is bigger. This allows users of the vehicles 130, etc. to be given motivation to participate in the electric power demand/supply adjustment beyond the concern about the consumption of the batteries 140, etc.

Alternatively, the incentive imparting unit 226 sets an incentive, which is imparted per participation in electric power demand/supply adjustment, to be higher, that is, sets more points as the deterioration degree of the corresponding battery 140 or the like, which is obtained from the above performance index, is smaller. This allows users, who have the batteries 140, etc. being less consumed and having high charge/discharge capabilities, to be further encouraged to participate in the electric power demand/supply adjustment.

The incentive imparting unit 226 saves the above set incentive in the "Set incentive" column in the provider information of the corresponding provider which is stored in the provider management DB 250. In addition, the incentive imparting unit 226 transmits, before the batteries 140, etc. of the vehicles 130, etc. of the registered providers are actually used as the electric power demand/supply adjustment means, information on the size or amount of the incentive set for each of the providers, that is, the number of points to a mobile device of the provider so as to notify and propose to the provider. Thus, the provider can check in advance the number of points that are to be actually imparted in participation in the electric power demand/supply adjustment and therefore, can participate in the electric power demand/supply adjustment, based on a proper determination.

The provider can check the set incentive by the above notification, determine whether or not to participate in the next electric demand/supply adjustment, and transmit a result of the determination to the electric power demand/supply management device 100 via the own mobile device. The above determination result which has been transmitted is saved by the provider management unit 220 in the "Refusal of next participation" column in the provider information of the provider which is stored in the provider management DB 250.

The incentive imparting unit 226 also receives a participation report from the demand/supply control unit 228 (described later) when the battery 140 or the like of the provider is actually used for the electric power demand/supply adjustment. In addition, the incentive imparting unit 226 refers to the provider management DB 250 in response to the reception of the participation report from the demand/supply control unit 228 and adds the number of points in the "Set incentive" column to the number of possessed points in the "Possessed incentive" column of the provider information including a provider ID included in the participation report, thereby updating the "Possessed incentive" column.

Further, the incentive imparting unit 226 refers to the provider management DB 250 when having updated the number of possessed points in the "Possessed incentive" column and transmits, to the customer management server 108 of an electric power company, customer information in which the updated number of possessed points and the customer number of the corresponding provider are associated. The customer management server 108 performs, on the basis of the received customer information, in calculating electric power charge of a customer having the customer number included in the customer information, discount processing for electric power charge, etc. by using the number of possessed points which is associated with the customer number in the customer information.

In addition, the customer management server 108 transmits, when having performed discount processing using the number of possessed points, used point information indicating the number of used points for each customer number, which have been used in the discount processing, to the electric power demand/supply device 100. The incentive imparting unit 226 refers to the provider management DB 250 in response to the reception of the used point information, subtracts the above number of used points from the number of possessed points in the "Possessed incentive" column of the provider information which is associated with the customer number included in the used point information, thereby updating the "Possessed incentive" column.

The demand/supply control unit 228 obtains electric power demand/supply information on an electric power demand/supply balance from the electric power transmission/distribution command center 104 and detects the occurrence of an imbalance in electric power demand/supply, that is, a surplus of electric power or a shortage of electric power. For example, the electric power transmission/distribution command center 104 transmits electric power demand/supply information to the electric power demand/supply management device 100 at a predetermined time interval. This electric power demand/supply information can include the ratio of the electric power consumption amount consumed by the factory 114 and the like, and house 120 and the like to the effective maximum electric power amount of the power plants 110 and 112 connected to the electric power transmission/distribution system 102 (hereinafter, also referred to as a demand/supply balance value).

The demand/supply control unit 228 detects, based on the above received electric power demand/supply information, the occurrence of a surplus of electric power or a shortage of electric power when the demand/supply balance value falls outside a predetermined value range; and starts electric power demand/supply adjustment. Specifically, the demand/supply control unit 228 refers to the provider management DB 250 and obtains the provider IDs and facility IDs of providers for which the "Refusal of next participation" column of the provider information indicates "OK." Then, it stores the obtained provider IDs as participated providers who have participated in the electric power demand/supply adjustment. In addition, the demand/supply control unit 228 transmits a command to the charge/discharge control devices 150, etc. having the obtained facility IDs; sets the charge/discharge control devices 150, etc. to a charge operation mode or a discharge operation mode according to whether the above detected imbalance in electric power demand/supply is due to a surplus of electric power or a shortage of electric power; and starts their operation. Thus, the charge operation or discharge operation of the battery 140 and the like is started. Here, it is assumed that the communication addresses of the charge/discharge control devices 150, etc. used for transmitting a command are stored in the storage device 202 in association with those facility IDs in advance.

In addition, the demand/supply control unit 228 determines, when the demand/supply balance value in the electric power demand/supply information that is repeatedly transmitted from the electric power transmission/distribution command center 104 falls within a predetermined range, that the demand/supply balance has been recovered; and ends the electric power demand/supply adjustment. That is, the demand/supply control unit 228 instructs the charge/discharge control devices 150, etc. currently in operation, to stop the charge/discharge operation. Then, the demand/supply control unit 228 transmits a participation report including the provider IDs of the stored participated providers, to the incentive imparting unit 226.

3. Configuration of Vehicles 130, Etc

Figure 3:
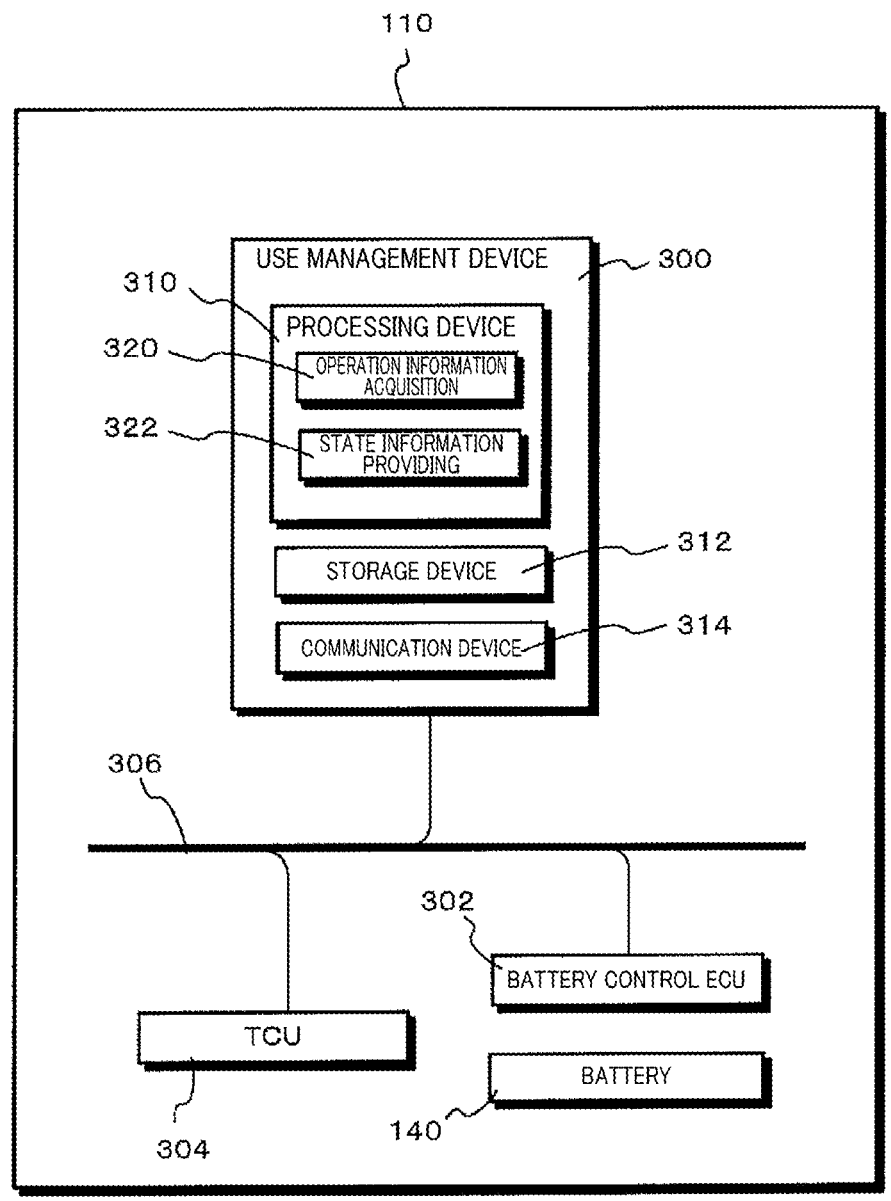
FIG. 3 shows one example of the configuration of a vehicle provided with a battery whose state information is obtained by the electric power demand/supply management device shown in FIG. 2.

Next, an example of the configuration relating to transmission processing of state information, which can be used in the vehicles 130, etc. will be described with reference to FIG. 3. It is noted that the vehicles 130, etc. can have the same configuration for the transmission processing of state information and therefore, the vehicle 130 is taken as an example in FIG. 3, to show its configuration.

In the illustrated example, the vehicle 130 includes: a use management device 300 configured as, for example, an electronic control unit (ECU); a battery control ECU 302; and a telemetry control unit (TCU) 304. The use management device 300, battery control ECU 302, and TCU 304 are communicably connected with one another via an on-vehicle network bus 306. Here, the on-vehicle network bus 306 is, for example, a CAN bus conforming to the CAN (Controller Area Network) communication standard.

The battery control ECU 302, which is connected to the battery 140 provided in the vehicle 130, controls the charge/discharge operation of the battery 140 and also obtains the operation information of the battery 140 by a sensor (not illustrated) provided in the battery 140. That is, the battery control ECU 302 measures a voltage, current, and output impedance at the time of charge and discharge of the battery 140, the charge capacity at the time of full charge, the temperature of the battery 140, and the like at respective predetermined time intervals and obtains these measurement data pieces as operation information. In addition, the TCU 304, which includes a wireless device, communicates with the electric power demand/supply management device 100 via an internet connected to a public line or the like.

The use management device 300 includes a processing device 310, a storage device 312, and a communication device 314. The storage device 312 is configured of, for example, a volatile and/or nonvolatile semiconductor memory, and/or hard disk device. In the storage device 312, data required for processing in the processing device 310 is stored in advance or as the processing proceeds. The communication device 314 is, for example, a CAN transceiver for communicating with other devices such as the battery control ECU 302 via the on-vehicle network bus 306 which is, for example, a CAN bus.

The processing device 310 is, for example, a computer provided with a processor such as a CPU. The processing device 310 may be configured to include a ROM in which a program has been written and a RAM for temporarily storing data. In addition, the processing device 310 includes, as function elements or function units, an operation information acquisition unit 320 and a state information providing unit 322.

These function elements included in the processing device 310 are implemented by, for example, executing a program by the processing device 310 that is a computer. It is noted that the above computer program can be stored in any computer-readable storage medium.

The operation information acquisition unit 320 obtains operation information of the battery 140 from the battery control ECU 302; and stores, in the storage device 312, data at the time of latest charge, that is, the voltage, current, output impedance, and charge capacity at the time of latest charge. In addition, the operation information acquisition unit 320 periodically obtains the above operation information; and stores, in the storage device 312, data at the time of discharge of the battery 140 in a latest predetermined time, that is, the voltage, current, and output impedance at the time of discharge.

In addition, the operation information acquisition unit 320 periodically obtains the above operation information; and saves, in the storage device 312, the temperature data of the battery 140 in a latest predetermined time as a temperature history.

The state information providing unit 322 obtains, for example, when receiving via the network 106 a state information transmission request transmitted from the electric power demand/supply management device 100, the charge data, discharge data, and temperature history, which are saved by the operation information acquisition unit 320, from the storage device 312; and transmits them to the electric power demand/supply management device 100 as state information.

4. Processing in Electric Power Demand/Supply Management Device 100

Figure 6:
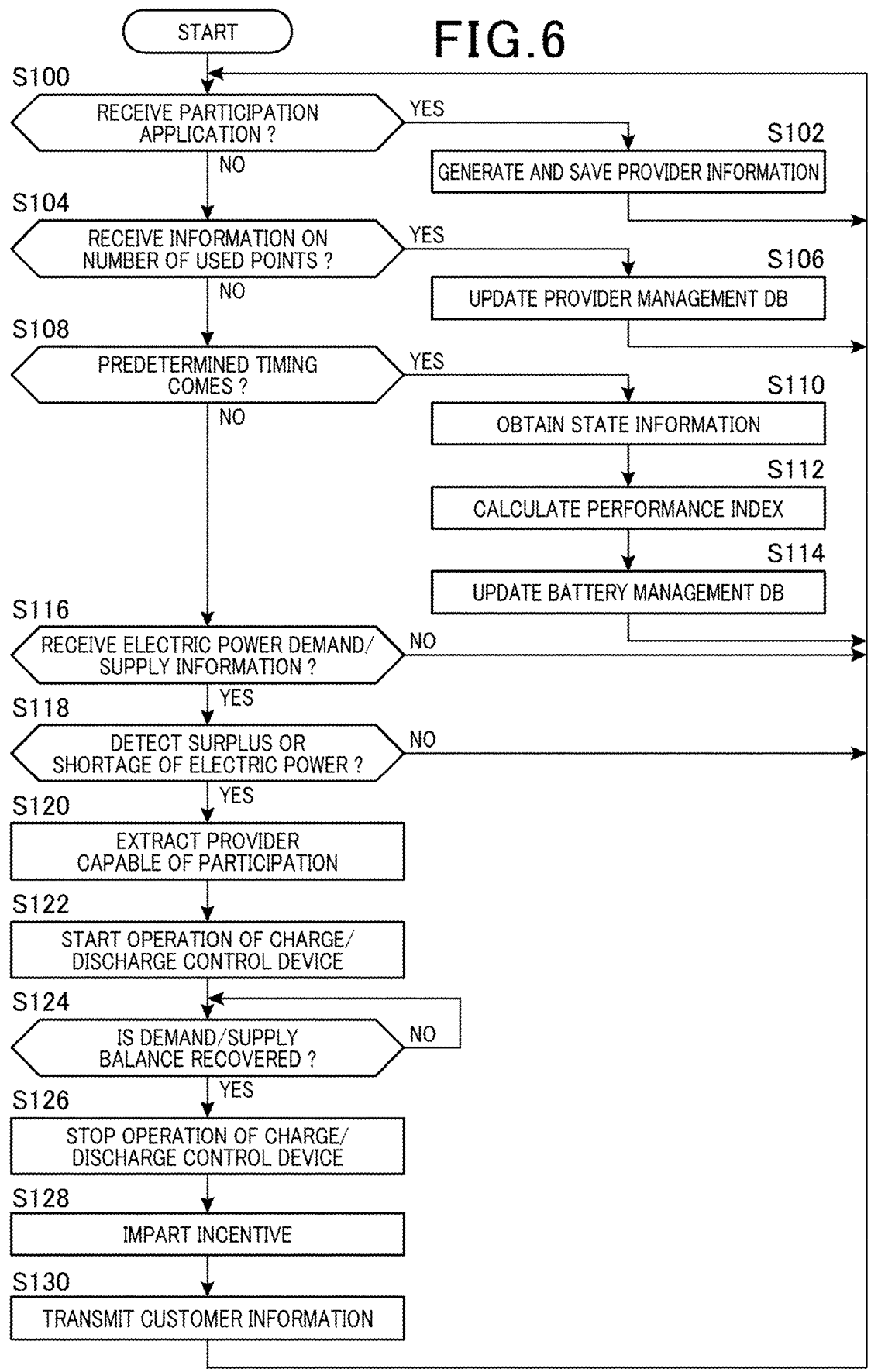
FIG. 6 is a flowchart showing the procedure of processing in the electric power demand/supply management device shown in FIG. 2.

Next, processing in the electric power demand/supply management device 100 will be described using the flowchart shown in FIG. 6. This processing starts when the power of the electric power demand/supply management device 100 is turned on, and ends when turned off.

When the processing starts, the provider management unit 220 of the processing device 200 determines whether a participation application has been received (S100). When it has been received (S100, YES), provider information of a user of the vehicle 130 or the like who has transmitted the participation application is created based on the received participation application and is saved in the provider management DB 250 (S102); and then, the processing returns to step S100 and is repeated.

On the other hand, when a participation application has not been received (S100, NO), the incentive imparting unit 226 determines whether information on the number of used points has been received from the customer management server 108 of an electric power company (S104). When it has been received (S104, YES), the incentive imparting unit 226 performs subtraction from the number of possessed points of a corresponding provider, which is saved in the provider management DB 250, based on the received information on the number of used points; and updates the provider management DB 250 (S106); and then, the processing returns to step S100 and is repeated.

On the other hand, when information on the number of used points has not been received (S104, NO), the state information acquisition unit 222 determines whether a predetermined timing for obtaining state information of the battery 140, etc. has come (S108). When it has come (S108, YES), the state information acquisition unit 222 obtains state information of the batteries 140, etc. from the vehicles 130, etc. of respective providers (S110). Subsequently, the performance calculation unit 224 calculates the performance index of each of the batteries 140, etc., based on the obtained state information (S112). Then, the state information acquisition unit 222 and performance calculation unit 224 respectively save the obtained state information and the calculated performance index in the battery management DB 252, updating the battery management DB 252 (S114).

On the other hand, when a predetermined timing has not come (S108, NO), the demand/supply control unit 228 determines whether electric power demand/supply information has been received from the electric power transmission/distribution command center 104 (S116). When it has been received (S116, YES), the demand/supply control unit 228 then determines, based on the received electric power demand/supply information, whether an imbalance in electric power demand/supply has been detected, that is, whether a surplus of electric power or a shortage of electric power has been detected (S118). When it has been detected (S118, YES), the demand/supply control unit 228 refers to the provider management DB 250 and extracts providers capable of participating in electric power demand/supply adjustment. Specifically, the demand/supply control unit 228 extracts, as providers capable of participation, providers for which the "Refusal of next participation" of the provider information, which is saved in the provider management DB 250, indicates "OK."

Then, the demand/supply control unit 228 refers to the provider management DB 250; identifies a charge/discharge control devices 150, etc. which are installed in a house 120 and the like of the providers, from the facility IDs indicated by the provider information of the above extracted providers; and transmits a command to the identified charge/discharge control devices 150, etc. so as to make their operation start (S122). Here, the demand/supply control unit 228 sets, in starting the above operation, the charge/discharge control devices 150, etc. to a charge operation mode or a discharge operation mode according to whether the above detected imbalance in electric power demand/supply is due to a surplus of electric power or a shortage of electric power.

Subsequently, the demand/supply control unit 228 determines whether or not the demand/supply balance has been recovered (S124), based on the electric power demand/supply information which is transmitted from the electric power transmission/distribution command center 104 at a predetermined time interval (S124); and when it has not been recovered (S124, NO), processing returns to step S124 and waits for recovery. On the other hand, when the demand/supply balance has been recovered (S124, YES), the demand/supply control unit 228 transmits a command to each of the charge/discharge control devices 150, etc. whose operations have been started at step S122, so as to stop their operations (S126); and transmits a participation report including provider IDs of the providers extracted at step S120, to the incentive imparting unit 226.

The incentive imparting unit 226 imparts an incentive to each of the providers who have participated in electric power demand/supply adjustment, based on the participation report transmitted from the demand/supply control unit 228 (S128). Specifically, the incentive imparting unit 226 accesses the provider management DB 250; and adds the number of points indicated by the set incentive to the number of possessed points indicated by the possessed incentive in the provider information of each of the providers who have participated in the electric power demand/supply adjustment; thereby updating the possessed incentive.

Next, the incentive imparting unit 226 refers to the provider management DB 250; transmits customer information in which the updated number of possessed points and the customer number of a corresponding provider are associated, to the customer management server 108 of the electric power company (S130); and then, makes the processing return to step S100.

5. Modified Example

It should be noted that the present invention is not limited to the configuration described in the above embodiment and a variety of variations and modifications may be effected without departing from the spirit and scope thereof.

For example, the incentive imparting unit 226 of the electric power demand/supply management device 100 may set an incentive to providers who have participated in electric power demand/supply adjustment, based on a performance index calculated by the performance calculation unit 224 and also based on the occurrence frequency of a surplus of electric power or a shortage of electric power in the electric power transmission/distribution system 102.

For example, the incentive imparting unit 226 may set, according to the occurrence frequency of a surplus of electric power or a shortage of electric power in the electric power transmission/distribution system 102, an incentive for providers to be different in size (or amount) between a case where the operation of the batteries 140, etc. in participating in electric power demand/supply adjustment is a charging operation and a case where the operation is a discharging operation. Specifically, for example, it may set a higher incentive for the discharging operation compared to an incentive for the charging operation, for a month in which the occurrence frequency of a shortage of electric power is higher or is expected to be higher compared to the occurrence frequency of a surplus of electric power. For example, the demand/supply control unit 228 may store the monthly records of the occurrences of a surplus of electric power and a shortage of electric power, in the storage device 202; and the incentive imparting unit 226 may set an incentive by using the occurrence frequencies of a surplus of electric power and a shortage of electric power which are calculated from the above stored occurrence records.

In addition, in this embodiment, the batteries 140, etc. are those mounted on the vehicles 130, etc. that are electric vehicles; but are not limited thereto. For example, the batteries 140, etc. may be any batteries which are provided as a power source on any conveyance. Such a conveyance may be, for example, an electric bicycle. In addition, the batteries 140, etc. are not limited to batteries mounted on a conveyance and may be batteries connected to a power generation device (for example, a photovoltaic power generation device) (not illustrated) which is provided on the house 120 and the like. In these cases, a sensor (not illustrated) for detecting the operation information of the battery 140 or the like and a communication device (not illustrated) connected to the sensor may be provided on a charging device of the battery or on the battery itself; and the state information acquisition unit 222 may obtain the state information of the battery via the communication device.

In addition, in this embodiment, the battery 140 or the like of the vehicle 130 or the like of a provider participates in the electric power demand/supply adjustment via the charge/discharge control device 150 or the like provided in the house 120 or the like of the provider; but it is not limited thereto. The batteries 140, etc. of the vehicles 130, etc. may participate in the electric power demand/supply adjustment by being connected to any of the charge/discharge control devices 150, etc. provided in public facilities such as a convenience store and a charging station. In this case, the charge/discharge control device 150 or the like may obtain, when being connected with the battery 140 or the like, a vehicle identification number from the vehicle 130 or the like and transmit it to the electric power demand/supply control device 100. The demand/supply control unit 228 may refer to the provider management DB 250, obtain a provider ID corresponding to the vehicle identification number transmitted from the charge/discharge control device 150 or the like, and perform the operation described above.

6. Conclusion

As described above, the electric power demand/supply management device 100 of the embodiment includes: the state information acquisition unit 222 that obtains state information indicating the current state of the battery 140 or the like; and the performance calculation unit 224 that calculates a performance index indicating the consumption degree of the battery 140 or the like from the state information. In addition, the electric power demand/supply management device 100 includes the incentive imparting unit 226 that imparts an incentive according to a value of the above performance index, to a provider who provides the battery 140 or the like as the electric power demand/supply adjustment means of the electric power transmission/distribution system 102.

According to this configuration, an incentive according to the consumption state of the battery 140 or the like is imparted to a provider of the battery 140 or the like and therefore, even a user of the vehicle 130 or the like whose battery 140 or the like has been consumed to some degree can be effectively encouraged to participate in the electric power demand/supply adjustment.

Further, in the electric power demand/supply management device 100, the above performance index represents the deterioration degree or lifetime of the battery 140 or the like. According to this configuration, the consumption degree of each of the batteries 140, etc. can be appropriately grasped and the sizes of incentives to be imparted to providers can be equitably calculated.

In addition, in the electric power demand/supply management device 100, the incentive imparting unit 226 sets an incentive imparted to a provider to be greater as the consumption degree indicated by the above performance index is larger. According to this configuration, a tendency in which users of the batteries 140, etc. that are further consumed hesitate to participate in the electric power demand/supply adjustment can be eliminated, thereby being able to encourage the participation of the batteries 140, etc. in the electric power demand/supply adjustment.

In addition, in the electric power demand/supply adjustment device 100, the incentive imparting unit 226 presents the incentives described above to providers before the batteries 140, etc. actually participate in the electric power demand/supply adjustment, and imparts the presented incentives to the providers after the batteries 140, etc. actually participate in the electric power demand/supply adjustment. According to this configuration, the providers can check in advance the number of points that are to be actually imparted in participation in the electric power demand/supply adjustment and therefore, can participate in the electric power demand/supply adjustment based on proper determination. In addition, since incentives are imparted only to the providers who actually have participated in the electric power demand/supply adjustment, fairness in imparting incentives can be maintained.

Further, in the electric power demand/supply management device 100, the operation of the batteries 140, etc. as the electric power demand/supply adjustment means is: the charging operation from the electric power transmission/distribution system 102 to the batteries 140, etc.; or the discharging operation to the electric power transmission/distribution system 102 from the batteries 140, etc. And further, in the electric power demand/supply management device 100, the incentive imparting unit 226 sets, according to the occurrence frequency of a surplus of electric power or a shortage of electric power in the electric power transmission/distribution system 102, an incentive for providers to be different in size between a case where the operation of the batteries 140, etc. in participating in the electric power demand/supply adjustment is a charging operation and a case where the operation is a discharging operation.

According to this configuration, the degree of encouragement for the batteries 140, etc. to participate in the electric demand/supply adjustment can be adjusted according to the degree of tightness in the electric power demand/supply balance (for example, the degree of tendency of occurrence of a surplus of electric power and/or the degree of tendency of occurrence of a shortage of electric power) in the electric power transmission/distribution system 102. For example, when it is determined that the occurrence frequency is higher and the condition is tighter, a greater incentive is set so as to encourage the participation of more batteries 140, etc.

In addition, in the electric power demand/supply management device 100, the batteries 140, etc. are batteries mounted on the vehicles 130, etc. as a power source. According to this configuration, a battery having a storage capacity sufficient for a power source of a vehicle is used as the electric power demand/supply adjustment means, thereby allowing a balance in electric power demand/supply to be effectively improved. In addition, the state information of the battery 140 or the like can be easily obtained via a communication device such as the TCU 304 which is provided in the vehicle 130 or the like including the battery 140 or the like.

REFERENCE SIGNS LIST

100 . . . electric power demand/supply management device, 102 . . . electric power transmission/distribution system, 104 . . . electric power transmission/distribution command center, 106 . . . network, 108 . . . customer management server, 110, 112 . . . power plant, 114, 116 . . . factory, 120, 122, 124, 126, 128 . . . house, 130, 132, 134 . . . vehicle, 140, 142, 144 . . . battery, 150, 152, 154 . . . charge/discharge control device, 200, 310 . . . processing device, 202, 312 . . . storage device, 204, 314 . . . communication device, 220 . . . provider management unit, 222 . . . state information acquisition unit, 224 . . . performance calculation unit, 226 . . . incentive imparting unit, 228 . . . demand/supply control unit, 250 . . . provider management database (provider management DB), 252 . . . battery management database (battery management DB), 300 . . . use management device, 302 . . . battery control ECU, 304 . . . telemetry control unit (TCU), 306 . . . on-vehicle network bus, 320 . . . operation information acquisition unit, 322 . . . state information providing unit

What is claimed is:

1. An electric power demand/supply management device comprising:
    a state information acquisition unit that obtains state information indicating a current state of a battery;
    a performance calculation unit that calculates a performance index indicating a deterioration degree of the battery from the state information; and
    an incentive imparting unit that imparts an incentive according to a value of the performance index to a provider who provides the battery as electric power demand/supply adjustment means of an electric power transmission/distribution system, wherein the incentive imparting unit imparts either a higher incentive for a bigger deterioration degree of the battery that is indicated by the value of the performance index or the higher incentive for a smaller deterioration degree of the battery that is indicated by the value of the performance index.

2. The electric power demand/supply management device according to claim 1, wherein
    the performance index represents a lifetime of the battery.

3. The electric power demand/supply management device according to claim 1, wherein
    the incentive imparting unit presents the incentive to the provider before the battery actually participates in electric power demand/supply adjustment; and imparts the presented incentive to the provider after the battery actually participates in the electric power demand/supply adjustment.

4. The electric power demand/supply management device according to claim 1, wherein
    an operation of the battery as the electric power demand/supply adjustment means is a charging operation from the electric power transmission/distribution system to the battery or a discharging operation to the electric power transmission/distribution system from the battery; and
    the incentive imparting unit sets, according to an occurrence frequency of a surplus of electric power or a shortage of electric power in the electric power transmission/distribution system, an incentive for the provider to be different in size between a case where the operation of the battery in participating in the electric power demand/supply adjustment is the charging operation and a case where the operation is the discharging operation.

5. The electric power demand/supply management device according to claim 1, wherein
    the battery is a battery mounted on a vehicle as a power source.

* * * * *